June 10, 1941.  A. L. JUDSON ET AL  2,244,783
CONTROL DEVICE
Filed March 17, 1938  3 Sheets-Sheet 2

Inventors
Albert L. Judson
Carl G. Kronmiller
George H Fisher
Attorney

Patented June 10, 1941

2,244,783

UNITED STATES PATENT OFFICE 2,244,783

CONTROL DEVICE

Albert L. Judson, Portland, Oreg., and Carl G. Kronmiller, Minneapolis, Minn., assignors to Minneapolis-Honeywell Regulator Company, Minneapolis, Minn., a corporation of Delaware Application March 17, 1938, Serial No. 196,447

13 Claims. (Cl. 200—83)

This invention relates to control devices and more particularly to control devices for use in controlling a refrigerating apparatus.

This invention is directed to an improved control device of the type disclosed in application Serial No. 101,099 filed by C. B. Spangenberg on September 16, 1936.

An object of this invention is to provide new and improved switching arrangements and adjustments therefor for accomplishing in a more direct, efficient and improved manner the sequence of operation of the above referred to C. B. Spangenberg application.

A further object of this invention is to provide an improved control arrangement for obtaining manual reset of the high pressure control device which represents an improvement over the manual reset control arrangement of application Serial No. 196,449 filed by A. B. Newton on even date herewith.

Still another object of this invention is to provide an improved control arrangement for controlling auxiliary equipment associated with the refrigerating apparatus such as defrosting fans and circulators as illustrated in application Serial No. 196,452 filed by A. B. Newton on even date herewith.

Other objects and advantages reside in the details of construction and mode of operation of the arrangements disclosed in the accompanying specification, claims and drawings, in which:

Figures 1, 2, 16:
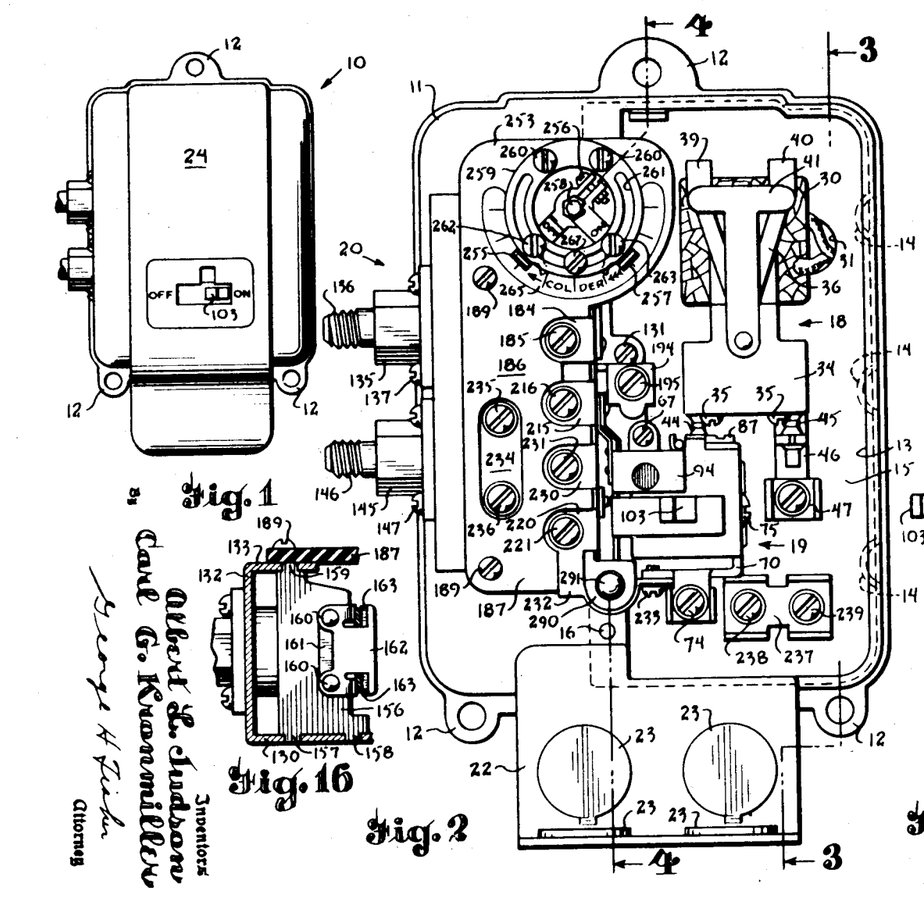
Figure 1 is a front elevational view of the control mechanism of this invention with the cover in place.
Figure 2 is an enlarged front elevational view with the cover removed.
Figure 16 is a detailed view of the fulcrums of the operating levers taken substantially along the line 16—16 of Figure 5.
Figure 3:
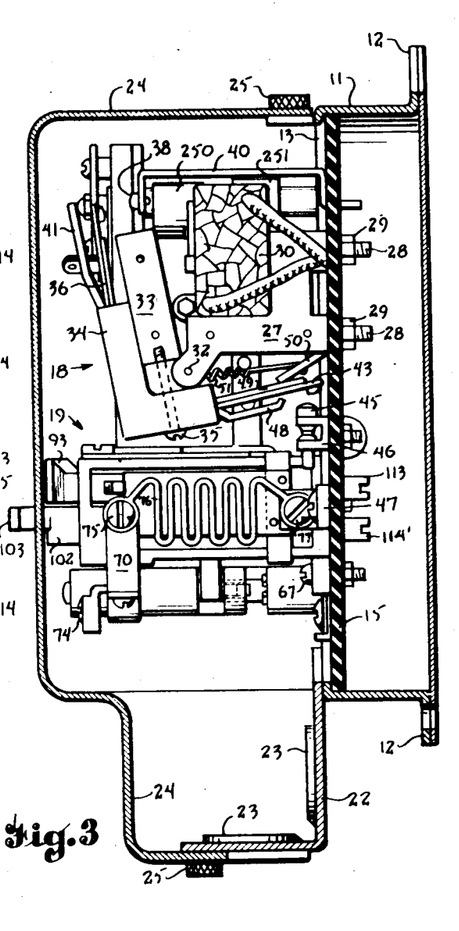
Figure 3 is a sectional view taken substantially along the line 3—3 of Figure 2.

Referring now to Figures 1, 2 and 3, the control mechanism of this invention is generally designated at 10. This control mechanism may comprise a hollow base 11 having apertured lugs 12 for mounting the base 11 to any suitable support. The surface of the base 11 contains a large aperture 13 and the side wall of the base 11 is provided with punched-in portions or detents 14. A sub-base 15 preferably made of insulating material is slipped in between the upper surface of the base 11 and the detents 14 to close the aperture 13 in the base 11, this sub-base 15 being held in place on the base 11 by the detents 14 and suitable rivets 16.

Mounted on this sub-base 15 is a relay or starter generally designated at 18 and an overload cut-out mechanism generally designated at 19. Mounted on the base 11 to the left of the aperature 13 as viewed in Figure 2, is a control device generally designated at 20. This control device may be operated in accordance with variations in low and high pressure of the refrigerating apparatus for controlling the operation of the relay or starter 18. Secured to the base 11 in any suitable manner is a downwardly extending plate 22 having suitable knock-outs 23 for the reception of electrical conduits or lead wires. A cover 24 fits on the base 11 and the plate 22 to cover the relay 18, the overload cut-out 19 and the control device 20, and also to form a conduit housing coextensive with the plate 22. All of the parts of the control arrangement 10 are therefore enclosed within the cover 24. The cover 24 may be held in place by suitable knurled nuts 25.

Referring now particularly to Figures 2 and 3, the relay or starter 18 is shown to comprise a laminated core 27 provided with studs 28 which extend through the sub-base 15. Nuts 29 screwthreadedly mounted on the studs 28 hold the core 27 of the relay in place on the sub-base 15. An operating coil 30 is suitably mounted on the core 27 and is provided with leads which extend through an aperature 31 in the sub-base 15. The core 27 is provided with a pivot 32 upon which is pivotally mounted a laminated armature 33. An insulating pad 34 is suitably secured to the armature 33 by means of screws 35. The insulating pad 34 carries a V-shaped bridge member 36 which is provided with contacts for engaging contacts 37 and 38 carried by brackets 39 and 40 suitably secured to the sub-base 15. The brackets 39 and 40 also extend through the sub-base 15 to form electrical connections at the back thereof. A T-shaped guide 41 also carried by the insulating pad 34 protects the V-shaped bridge member 36. The insulating pad 34 also carries a bridge member 43 which carries contacts adapted to engage stationary contacts 44 and 45. The stationary contact 44 is carried by the overload cut-out mechanism 19 and the stationary contact 45 is carried by a terminal bracket 46 suitably secured to the sub-base 15. The bracket 46 is provided with a terminal screw 47 to which electrical connections can be made. The insulating pad 34 carries a bracket 48 for protecting the bridge member 43 and also carries a member 49 which is adapted to engage a stationary abutment 50. A spring 51 located between the stationary abutment 50 and the armature 33 urges the armature 33 away from the core 27 as shown in Figure 3 of the drawings.

Upon energization of the operating coil 30 the armature 33 is attracted to move the contacts of the bridge member 36 into engagement with the contacts 37 and 38 carried by the brackets 39 and 40, and to move the contacts of the bridge member 43 into engagement with the stationary contacts 44 and 45. When the operating coil 30 is deenergized, the armature 33 is moved to the left as viewed in Figure 3 by means of the spring 51 and also by means of gravity, the amount of left-hand movement being limited by the stationary abutment 50. This left-hand movement of the armature 53 separates the contacts of the bridge member 36 from the contacts 37 and 38 and also separates the contacts of the bridge member 43 from the stationary contacts 44 and 45. As will be pointed out more fully hereafter, the bridge member 43 and the stationary contacts 44 and 45 form a load switch for the compressor circuit and the bridge member 36 and contacts 37 and 38 form a maintaining switch for the relay or starter 18.

Figure 8:
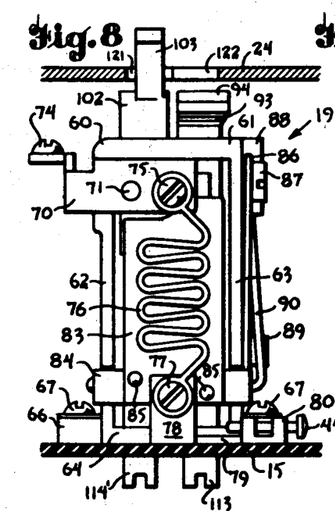
Figure 8 is an elevational view of the overload cutout mechanism looking from the right of Figure 2.
Figure 9:
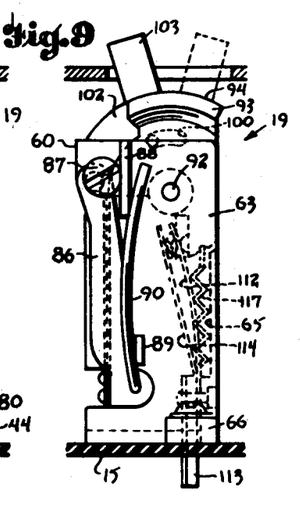
Figure 9 is an elevational view of the overload cutout mechanism looking from the right of Figure 8.
Figure 10:
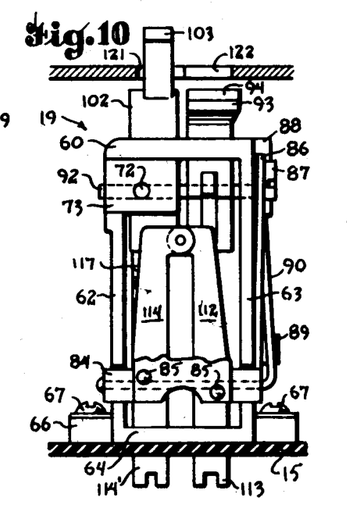
Figure 10 is a view of the overload cut-out mechanism similar to Figure 8 with the heating element and bimetallic element broken away.

Referring now more particularly to Figures 8, 9 and 10, the overload cut-out mechanism generally designated at 19 is shown to comprise a casing 60 preferably made of insulating material and having a top wall 61, side walls 62 and 63, a bottom wall 64 and a back wall 65. If desired the casing may be formed of a single integral unit as shown. The side walls 62 and 63 are formed with ears 66 through which screws 67 extend for securing the casing 60 to the sub-base 15. A conductor bracket 70 is suitably secured to the casing 60 by a rivet 71 extending through an opening 72 in a pad 73 carried by the casing 60. The conductor bracket 70 is provided with a terminal screw 74 and also with a screw 75 to which one end of a heater element 76 is secured. The other end of the heater element 76 is secured by a screw 77 to another bracket having an upstanding lug 78, a conductor bar 79 and lugs 80 to which is secured the stationary contact 44. The terminal 74 and the stationary contact 44 are included in series in the compressor motor circuit and the current flowing through this circuit will pass through the heater element 76 so that the heater element 76 is heated in accordance with the current conditions in the circuit.

A bimetallic element 83 is located adjacent the heater element 76 so as to be affected by the heat given off by the heater element. The bimetallic element 83 is secured to a bracket 84 by means of rivets 85, the bracket 84 having an arm 86 extending upwardly adjacent the side wall 63. The upper end of the arm 86 is provided with an eccentrically headed screw 87 which abuts against a pad 88 carried by the side wall 63. The arm 86 of the bracket 84 is also provided with a lug 89. A spring member 90 pivots the bracket 84 to the side walls 62 and 63 of the casing and extends upwardly between the lug 89 and the pad 88 to hold the eccentrically headed screw 87 in engagement with the pad 88. By rotating the eccentrically headed screw 87 the bracket 84 is rotated and hence the bimetallic element 83 is rotated inwardly or outwardly with respect to the casing 60. The construction thus far described provides a simple means for adjusting the position of the bimetallic element 83 as well as holding the parts in an assembled relation.

Figure 11:
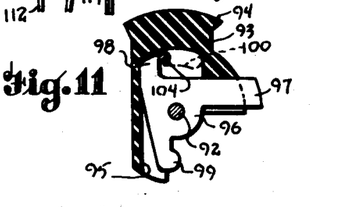
Figure 11 is a detail view of a portion of the overload cut-out mechanism utilized in Figures 8, 9 and 10.

Extending through the casing 60 from one side wall 63 to the other side wall 62 is a pivot pin 92. Mounted on this pivot pin between the wall 62 and 63 is a first member 93 having an indicating surface 94. The member 93 is hollowed out at 95 as shown in Figure 11 and located in the hollowed-out portion and also mounted on the shaft 92 is a second member 96. This second member 96 is provided with a tripping lug 97, a resetting lug 98 and a contact operated lug 99 as is clearly shown in Figure 11. The first member 93 is provided with an elongated slot 100, the function of which will be pointed out more fully hereafter.

Also mounted on the pivot pin 92 adjacent to the first member 93 is a third member 102 having an actuating handle 103. The third member 102 carries a pin 104 which extends through the slot 100 of the first member and which is adapted at certain times to engage the actuating lug 98 of the second member. The third member 102 is provided with opposed abutment surfaces 105 and 106 which are adapted to engage a lug 107 formed on the inner side of the pad 73. The lug 107 limits the amount of rotation of the third member 102 about the pivot pin 92. The third member 102 is provided with a contact operating lug 108 and is also provided with a V-notch 109. A torsion spring 110 about the pivot pin 92 is interposed between the first member 93 and the third member 102, this spring acting to rotate the two members in opposite directions. As viewed in Figure 12, this spring operates to rotate the first member 93 in a clockwise direction and the third member 102 in a counter-clockwise direction.

A resilient contact arm 112 is suitably carried by the back wall 65 of the casing 60 and extends downwardly through the sub-base 15 to form a terminal 113. A second resilient contact arm 114 also suitably secured to the back wall 65 of the casing 60 extends downwardly through the sub-base 15 to form a terminal 114'. The contact arm 112 carries a contact 115 and the contact arm 114 carries a contact 116, these contacts engaging each other under certain conditions. The contact arm 114 is normally in a relatively vertical position and the contact arm 112 is biased by its own resiliency to move normally the contact 115 out of engagement with the contact 116. A spring, which may be of the corrugated type, is shown at 117 in Figure 9 and this spring extends between the V-notch 109 of the third member 102 and a suitable notch formed in the back wall 65 of the casing 60. This spring operates as a detent or over-center device for holding the third member 102 in either of its extreme positions.

The cover 24 which encloses the control arrangement 10 may be provided with two openings 121 and 122. The opening 121 receives the handle 103 of the third member and the opening 122 exposes the indicating surface 94 of the first member 93. Formed on the indicating surface 94 of the first member 93 is an indicator 123 which moves into alignment with the opening 122 in the cover 24 whenever the overload cut-out switching mechanism is tripped open upon the occurrence of an overload condition.

Figure 12:
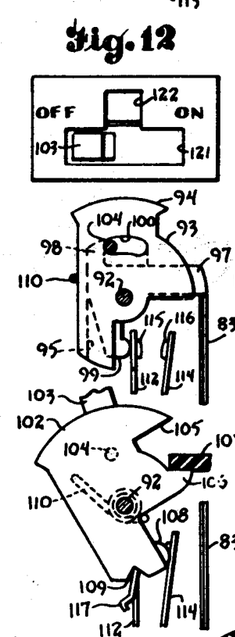
Figures 12, 13, 14 and 15 are exploded views showing the various parts of the overload cut-out mechanism in various operative positions.

Referring now to the exploded views of Figures 12, 13, 14 and 15, the mode of operation of this overload switching mechanism is disclosed. Each of these figures sets forth the positions of the parts with respect to the openings in the cover 24, the positions of the contacts 115 and 116 and the bimetallic element 83, and the positions of the first, second and third members 93, 96 and 102 respectively. Figure 12 illustrates the bimetallic element 83 engaging the tripping lug 97 of the second member 96 to hold the contact 115 in a position where it would normally be engaged by the contact 116. However, the handle 103 of the third member 102 is moved to the "off" position and is held in this "off" position by the corrugated over-center spring 117. When the member 102 is in the "off" position the contact operating lug 108 thereof engages the contact arm 114 to move the contact 115 to the right out of engagement with the contact 116. Hence with the parts in the position shown in Figure 12, the contacts 115 and 116 are separated and the switch is in the "off" or "open" position.

Figure 13:
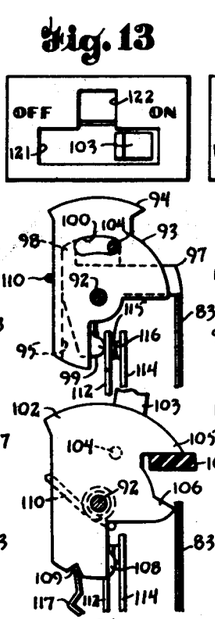

In Figure 13 the thermostatic element 83 is engaging the tripping lug 97 of the second member 96 and hence the contacts 115 and 116 are held in a closed position. The handle 103, however, is moved to the "on" position and is held in the "on" position by the corrugated over-center spring 117. With the third member 102 in this position, the contact operating lug 108 is moved away from the contact member 114 so that the contact 116 is in engagement with the contact 115 and the switch is in an "on" position.

Figure 14:
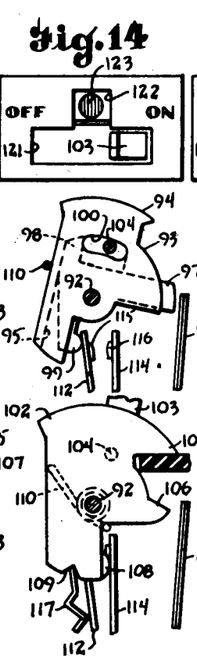

If now an overload condition in the compressor motor circuit should occur which results in excessive heating in the heating element 76, the bimetallic element 83 is flexed to the right as shown in Figure 14. When this occurs the bimetallic element 83 moves out from under the tripping lug 97 and the spring 110 rotates the first member 93 and hence the second member 96 in a clockwise direction. When this occurs the contact operating lug 99 of the second member 96 moves away from the contact arm 112 and due to the resiliency of contact arm 112 the contact 115 is moved out of engagement with the contact 116. Hence even though the handle 103 of the third member 102 is in the "on" position and an overload condition occurs, the contact 115 is moved out of engagement with the contact 116. The occurrence of an overload condition is indicated by the mark 123 of the indicating surface 94 being exposed in the opening 122 of the cover 24.

When the overload condition no longer exists and the thermostat element 83 cools down to move towards the left, the switching mechanism may be reset by moving the handle 103 of the third member 102 to the "off" position. When the handle 103 is thus moved to the "off" position, the contact operating lug 108 of the third member 102 engages the contact arm 114 to move the contact 115 to the right and the first and second members 93 and 96 are moved in a counter-clockwise direction by the pin 104 of the third member 102 to allow the bimetallic element 83 to engage the tripping abutment 97. The parts then assume the position shown in Figure 12 and when the handle is then moved to the "on" position as shown in Figure 13, the contact 116 engages the contact 115 as shown in Figure 13 and the parts are in position for further operation. From the above it is seen that the contacts 115 and 116 may be manually opened or closed and that they may be opened upon the occurrence of an overload condition. The parts are also arranged so that when the switching mechanism is being reset following the occurrence of an overload condition, the contacts are maintained apart until the switching mechanism is subsequently returned to the "on" position.

It is found that in previous overload cut-out arrangements that persons not familiar with the operation of the same will attempt to block the overload switching mechanism in the "on" position to prevent the same from cutting out upon the occurrence of overload conditions. By reason of the construction of the overload cut-out switching mechanism disclosed, blocking of the switching mechanism in the "on" position to prevent the same from cutting out upon the occurrence of an overload condition is impossible. As outlined above in connection with Figures 12, 13 and 14, the switching mechanism will open on the occurrence of an overload condition even though the handle 103 of the third member is held in the "on" position. Even if the first member is blocked in the "on" position as by a match or other device, the switching mechanism will be opened upon the occurrence of an overload cut-out condition.

Figure 15:
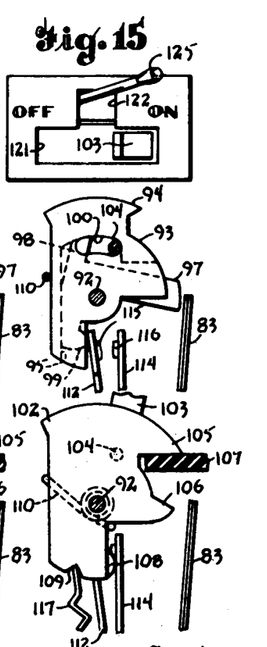

Referring now to Figure 15, the first member or indicating member is shown blocked in an "on" position by a match 125. If an overload condition should occur to move the bimetallic element 83 to the right the tripping lug 97 will be disengaged and the resiliency of the contact member 112 will rotate the second member 96 in a clockwise direction to allow movement of the contact 115 out of engagement with the contact 116. Hence it is impossible to prevent the contacts 115 and 116 from separating upon the occurrence of an overload condition.

From the above it is seen that a fool-proof overload cut-out switching mechanism generally designated at 19 is mounted on the sub-base 15 whereby it can be easily electrically connected to the relay or starter generally designated at 18. The overload cut-out mechanism 19 and the relay or starter 18 being mounted on a common sub-base 15 may be easily removed from the unitary control arrangement 19 without disturbing the other parts comprising the unitary control arrangement. The overload cut-out mechanism per se is disclosed and claimed in application Serial No. 196,448 filed on even date herewith by Albert L. Judson.

Figures 4, 5, 6, 7, 17:
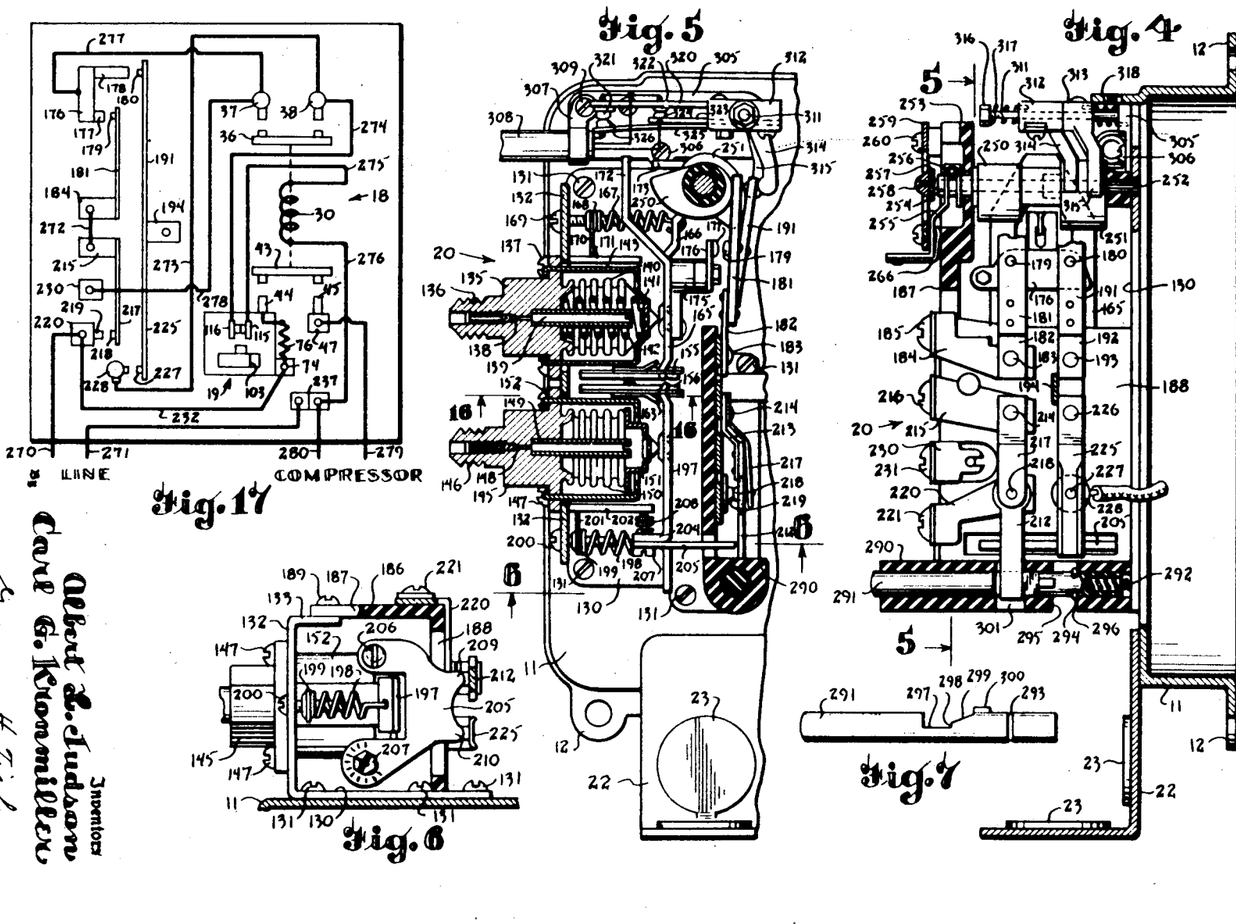
Figure 4 is a sectional view taken substantially along the line 4—4 of Figure 2.
Figure 5 is a sectional view taken substantially along the line 5—5 of Figure 4.
Figure 6 is a sectional view taken substantially along the line 6—6 of Figure 5.
Figure 7 is a detail view of a portion of the manual reset mechanism shown in Figure 4.
Figure 17 is a schematic wiring diagram of the control arrangement of this invention.

The control device generally designated at 20 may include a supporting bracket having a back wall 130 secured to the base 11 by screws 131, a side wall 132, and a front wall 133 as best viewed in Figures 6 and 16. The control device 20 may contain two pressure responsive devices, one responsive to variations in low pressure of the refrigerating apparatus or responsive to variations in temperature, and the other responsive to variations in pressure on the high pressure side of the refrigerating apparatus. A low pressure or temperature responsive device may include a fitting 135 provided with a screw threaded connection 136 to which may be applied a pipe or tube. The fitting 135 is secured to the side wall 132 of the support by means of screws 137. The fitting 135 is provided with a passage 138 which communicates through a tube 139 to the interior of a bellows 140. One end of the bellows 140 is suitably sealed to the fitting 135 and the other end is sealed to a plate 141. A spring 142 tends at all times to expand the bellows 140. A tubular housing 143 may also be secured to the fitting 135 for protecting the bellows 140 against damage. Upon an increase in pressure within the bellows 140, the bellows expands and upon a decrease in pressure the bellows contracts, the amount of contracting movement of the bellows being limited by the tube 139.

The high pressure responsive device is shown to comprise a fitting 145 provided with a screw threaded connection 146 and secured to the side wall 132 of the support by means of screws 147. The fitting 145 is also provided with a passage 148 which communicates through a tube 149 to the interior of the bellows 150. One end of the bellows 150 is sealed to the fitting 145 and the other end is sealed to a plate 151. The bellows 150 may also be suitably protectingly housed by a cylindrical casing 152 carried by the fitting 145. Upon a pressure increase the bellows 150 is expanded and upon a pressure decrease the bellows is contracted, the amount of contracting movement being limited by the tube 149.

Located between the two bellows assemblies are fulcrum members 155 and 156. These fulcrum members are similar in construction and the details thereof are more clearly shown in Figure 16. As viewed in Figure 16, the fulcrum member 156 is provided with lugs 157 and 158 which are staked to the back wall 130 of the support and a lug 159 which is staked to the front wall 133. In this manner the fulcrum member 156 is held rigidly within the support. Rivets 160 secure a knife-edge blade 161 and a reinforcing member 162 to the fulcrum member 156. The knife-edge member 161 is provided with knife edges 163 which are adapted to be engaged by a lever to form a fulcrum for the lever.

Fulcrumed on the fulcrum member 155 is a lever 165 which abuts a pin carried by the plate 141 of the low pressure or temperature responsive device. Lever 165 is provided with an extension 166 to which is secured one end of a tension spring 167. The other end of the tension spring is connected to a nut 168 screw threadedly mounted on a screw 169. The nut 168 is provided with an extension 170 which is adapted to slide in a guide 171 carried by the side wall 132 of the support. Hence rotation of the nut 168 is prevented. By rotating the screw 169 the tension in the spring 167 is varied to calibrate or adjust this portion of the control device. The lever 165 is also provided with an extension 172 which is adapted to engage a stop 173 carried by the back wall 130 of the support. This stop 173 limits the amount of expansion of the bellows 140.

The lever 165 carries an insulating pad 175 to which is secured a bridge member 176. The bridge member 176 carries contacts 177 and 178 which are adapted to engage relatively stationary contacts 179 and 180. The relatively stationary contact 179 is carried by a contact arm 181 which is suitably secured to a leaf spring 182. The leaf spring 182 is secured by a rivet 183 to a bracket 184 having a terminal screw 185. The bracket 184 is suitably secured to a base 186 preferably made of insulating material. The base 186 has a front wall 187 and a side wall 188, the base being secured to the front wall 133 of the support by means of screws 189. This construction is more clearly shown in Figure 6. The bracket 184 extends outwardly along the side wall 188 of the insulating support to the front wall 186 thereof to facilitate the making of electrical connections.

The other relatively stationary contact 180 is carried by a contact arm 191 which is suitably secured to a leaf spring 192. The leaf spring 192 is secured by a rivet 193 to a bracket 194 which extends outwardly along the side wall 188 of the insulating support 186. This bracket terminates at its outer extremity in a terminal having a terminal screw 195 as is illustrated in Figure 2.

The other fulcrum member 156 fulcrums a lever 197 which abuts a pin carried by the plate 151 of the high pressure responsive device. One end of a spring 198 connects to the lever 197 and the other end is secured to a nut 199 screw threadedly mounted on a screw 200. The nut 199 carries an extension 201 which slides in a guide 202 carried by the side wall 132 of the support. Rotation of the screw 200 therefore adjusts the tension in the spring 198 and adjusts the pressure setting of this portion of the control device.

As shown in Figures 5 and 6, the lever 197 is provided with a pair of depending lugs 204 to which is adjustably secured an abutment member 205. One end of the abutment member 205 is secured to one of the lugs 204 by an eccentrically headed screw 206, this eccentrically headed screw providing a means for factory calibrating the setting of this portion of the instrument. The other end of the abutment member 205 is secured to the other lug 204 by an eccentrically headed screw 207 which is frictionally held in its adjusted position by means of a spring 208. By rotating the screw 207 it is seen that the abutment member 205 is rotated relative to the lever 197. Suitable indicia are provided for indicating the amount of adjustment. The abutment member 205 is provided with two abutments 209 and 210.

The abutment 209 is adapted to engage an arm 212 which is suitably secured to a leaf spring 213. The leaf spring 213 is secured by a rivet 214 to a bracket 215 which extends outwardly along the side wall 188 of the insulating support and terminates at the outer wall 187 of the insulating support. This outward extremity of the bracket 215 is provided with a terminal screw 216. The bracket 215 also carries a resilient contact arm 217 which in turn carries a contact 218 which extends through an opening in the arm 212. The contact 218 is adapted to engage a contact 219 carried by a bracket 220 which also extends outwardly along the side wall 188 of the insulating support 186 to the outer wall 187 thereof. The bracket 220 is provided with a terminal screw 221.

The abutment 210 of the abutment member 205 is adapted to engage a resilient contact arm 225 which is riveted by a rivet 226 to the bracket 194. The resilient contact arm 225 carries a contact 227 which engages a stationary contact 228 carried by the side wall 188 of the insulating support 186. The contacts 218 and 219 and the contacts 227 and 228 are normally engaged.

Assume now that the pressure on the high pressure side of the refrigerating apparatus rises, the abutment 210 first engages the contact arm 225 to move the contact 227 out of engagement with the contact 228. Upon a further rise in high pressure the abutment 209 engages the arm 212 which after a predetermined amount of movement moves the contact 218 out of engagement with the contact 219. Upon a decrease in pressure on the high pressure side of the refrigerating apparatus the contacts close in reverse order. By rotating the eccentrically headed screw 207 the relative points at which the contacts 227 and 228 and the contacts 218 and 219 make and break may be adjusted at will. For purposes of illustration it is assumed that the contacts 227 and 228 make and break at substantially 135 lbs. and the contacts 218 and 219 make and break at substantially 185 lbs.

The outer wall 187 of the insulating support 186 may be provided with a terminal 230 and a terminal screw 231 to which electrical connections may be made for certain uses or applications of the instant control arrangement. The bracket 220 to which is secured the contact 219 may be provided with a bus bar or conductor 232 which is secured by a screw 233 to the bracket 70 of the overload cut-out device generally designated at 19. The outer wall 187 of the insulating support 186 may also be provided with a terminal 234 having terminal screws 235 and 236 which may facilitate electrical connections when the control arrangement of this invention is utilized in certain applications. The subbase 15 which carries the overload cut-out device 19 and the relay or starter 18 may also be provided with a terminal 237 having terminal screws 238 and 239.

The relatively stationary contacts 179 and 180 of the low pressure or temperature responsive portion of the control device may be adjusted by means of concentrically located cams 250 and 251 respectively. The leaf springs 182 and 192 hold the contact arms 181 and 191 into engagement with the surfaces of the cams 250 and 251 respectively so that upon rotation of the cams 250 and 251 the relatively stationary contacts 179 and 180 are adjusted with respect to the movable contacts 177 and 178. These leaf springs 182 and 192 also provide a strain release to permit movement of the bellows 140 after the contacts are closed. The cam 251 which adjusts the contact arm 191 is staked to a shaft 252. One end of the shaft 252 is suitably journaled in the lower wall 130 of the support and the other end of the shaft 252 is suitably journaled in an extension 253 of the insulating support 186. The cam 250 is rotatably mounted on the shaft 252 and is provided with an extension 254 journaled in the extension 253 of the insulating support 186. An adjusting arm 255 is clamped to the extension 254 by means of a nut and screw arrangement 256. Accordingly, upon rotation of the adjusting arm 255 the cam 250 is correspondingly rotated. An adjusting arm 257 is secured to the shaft 252 by a nut 258 so that upon rotation of the adjusting arm 257 the cam 251 is correspondingly adjusted. As will be pointed out more fully hereafter, the adjusting arm 255 adjusts the low pressure or temperature setting at which the refrigerating apparatus is turned "off" and the adjusting arm 257 determines at what low pressure or temperature setting the refrigerating apparatus is turned "on." A circular guide 259 is secured to the extension 253 of the insulating support 186 by means of screws 260. This guide 259 is provided with an elongated arcuate slot 261 through which extend screws 262 and 263 carried by the adjusting arms 255 and 257 respectively. Screws 262 and 263 provide a means for locking the adjusting arms 255 and 257 in any of their adjusted positions. A screw 267 adjustably mounted in the slot 261 is utilized for limiting the amount of movement of the adjusting arms 255 and 257 and therefore limits the amount of adjustment of the low pressure or temperature responsive device. The extension 253 of the insulating support 186 may be provided with suitable indicia 265 for indicating the adjustments that are made by the arms 255 and 257. Each arm 255 and 257 may be provided with a spring friction member 266 which frictionally engages the extension 253 for frictionally holding the arms 255 and 257 in any of their adjusted positions.

By positioning the arm 255 the cam 251 is adjusted to determine at what pressure value the contacts 178 and 180 are engaged and disengaged. By positioning the arm 257 the cam 250 is adjusted to determine at what pressure values the contacts 177 and 179 are engaged and disengaged. For purposes of illustration it is assumed that the arms 255 and 257 are so adjusted that the contacts 177 and 179 will engage and disengage at a pressure value of say 20 lbs. and the contacts 178 and 180 will engage and disengage at a pressure value of say 40 lbs.

Assume now that the fitting 145 is connected to the high pressure side of a refrigerating apparatus and that the fitting 135 is connected to the low pressure side of a refrigerating apparatus. When it is desired to control the refrigerating apparatus by the low pressure and by the high pressure a conductor 272 is placed between the brackets 215 and 184 as shown in the diagrammatic view of Figure 17. Line wires 270 and 271, leading from some source of power not shown, are connected to the terminal bracket 220 and to the terminal bracket 237 respectively. Stationary contact 228 is connected by a conductor 273 to the maintaining contact 38 which in turn is connected by a conductor 274 to the contact 116 of the overload cut-out. The other contact 115 of the overload cut-out is connected by a conductor 275 to one end of the operating coil 30 of the relay or starter. The other end of the operating coil 30 is connected by a conductor 276 to the terminal bracket 237. The bridge member 176 carrying the movable contacts 177 and 178 is connected by a conductor 277 to the maintaining contact 37 of the relay or starter 18. The terminal 230 may be connected by a conductor 278 to the maintaining contact 37 although when the system is utilized in its present manner this connection is not necessary. The compressor motor is connected by wires 279 and 280 to the load contact 45 and to the terminal bracket 237 respectively.

With the parts in the position shown in Figure 17, the relay or starter 18 is deenergized and hence the compressor is not operating. As a result, the high pressure of the refrigerating apparatus will decrease and the low pressure will increase. When the high pressure has decreased to 135 lbs., contacts 218 and 227 engage their respective contacts 219 and 228. When the low pressure has increased to 40 lbs., contacts 177 and 178 engage their respective contacts 179 and 180. When both of these contingencies occur a starting circuit is completed for the relay or starter 18 which may be traced from the line wire 270 through terminal bracket 220, contact 219, contact 218, contact arm 217, terminal bracket 215, conductor 272, terminal bracket 184, contact arm 181, contacts 179 and 177, bridge member 176, contacts 178 and 180, contact arm 191, terminal bracket 194, contact arm 225, contacts 227 and 228, conductor 273, maintaining contact 38, conductor 274, contacts 116 and 115 of the overload cut-out, conductor 275, operating coil 30, conductor 276 and terminal bracket 237 back to the other line wire 271. Completion of this starting circuit energizes the operating coil 30 to pull in the relay or starter 18 whereupon the bridge member 36 is moved into engagement with the maintaining contacts 37 and 38 and the bridge member 43 is moved into engagement with the load contacts 44 and 45.

Movement of the bridge member 43 into engagement with the load contacts 44 and 45 completes a compressor motor circuit which may be traced from the line wire 270, through terminal bracket 220, bus bar or conductor 232, bracket 274 of the overload cut-out 19, heater element 76, load contact 44, bridge member 43, load contact 45, conductor 279, the compressor motor, conductor 280 and terminal bracket 237 back to the other line wire 271. The compressor and hence the refrigerating apparatus is accordingly placed in operation.

Movement of the bridge member 36 into engagement with the maintaining contacts 37 and 38, completes a maintaining circuit for the operating coil 30 of the relay or starter which is independent of the contacts 178 and 180 and the contacts 227 and 228. This maintaining circuit may be traced from the line wire 270 through terminal bracket 220, contacts 219 and 218, contact member 217, terminal bracket 215, conductor 272, terminal bracket 184, contact member 181, contacts 179 and 177, bridge member 176, conductor 277, maintaining contact 37, bridge member 36, maintaining contact 38, conductor 274, contacts 116 and 115, conductor 275, operating coil 30, conductor 276 and terminal bracket 237 back to the other line wire 271. Completion of this maintaining circuit maintains the relay or starter pulled in and hence the refrigerating apparatus in operation even though the high pressure increases above 135 lbs. and the low pressure decreases below 40 lbs. In other words, this maintaining circuit will maintain the refrigerating apparatus in operation until such time as the high pressure rises to 185 lbs. to separate the contacts 218 and 219 or until the low pressure decreases to 20 lbs. to separate the contacts 177 and 179. After the compressor has once been stopped, it cannot again be placed in operation until such time as the high pressure decreases to 135 lbs. and the low pressure rises to 40 lbs. so as to close all of the control contacts.

If an overload condition occurs in the compressor circuit the overload cut-out 19 trips the contacts 115 and 116 open to drop out the relay or starter 18 and shut down the compressor. Upon manual manipulation of the reset arm 103 the compressor may again be placed in operation if the high pressure has decreased to 135 lbs. and the low pressure has risen to 40 lbs. Manual manipulation of the reset lever 103 to the "off" position interrupts the circuit to the operating coil 30 of the relay or starter and shuts down the compressor.

It may under certain circumstances be desirable to prevent automatic reclosing of the contacts 218 and 219 of the high pressure responsive device and to require manual reclosing of these contacts. If such be the case the insulating support 186 may be provided with an extension 290 having a longitudinal aperture in which is slidably mounted a pin 291. A spring 292 normally urges the pin 291 outwardly as viewed in Figure 4. The pin 291 may be provided with a circumferential groove 293 in which is mounted a spring ring 294 adapted to engage surfaces 295 and 296 formed in the extension 290 to limit the longitudinal movement of the pin 291. The pin 291 is provided with a detent or notch 297 having a latching surface 298 adapted to receive the end of the arm 212. A tapered surface 299 extends from the latching surface 298 to an abutment 300, and under certain conditions is adapted to operate the arm 212. The extension 290 is provided with an opening 301 for receiving the end of the arm 212.

Assuming the parts above described in the positions shown in Figure 4, the pin 291 is held inwardly by the arm 212 engaging the latching surface 298. Upon an increase in pressure on the high pressure side of the refrigerating apparatus to substantially 185 lbs. to cause the abutment 209 of the abutment member 205 to engage the arm 212. The arm 212 is thereupon moved out of engagement with the latching surface 298 up onto the tapered surface 299. As a result, the spring 292 rapidly moves the pin 291 outwardly to cause the tapered surface 299 to move the arm 212 rapidly into engagement with the resilient contact arm 217. When engagement of the arm 212 with the contact arm 217 is brought about, the contact 218 is moved rapidly out of engagement with the contact 219 thereby breaking the above referred to starting and maintaining circuits to drop out the relay or starter 18 and stop operation of the compressor motor. Upon a decrease in pressure on the high pressure side of the refrigerating apparatus the contact 218 cannot again be automatically moved into engagement with the contact 219.

In order to re-engage these two contacts 218 and 219 the pin 291 must be moved inwardly against the action of the spring 292 and if at this time the pressure on the high pressure side has decreased sufficiently the arm 212 will engage the latching surface 298 to condition the parts for further operation. Hence with the arrangement just described, a simple and novel arrangement for requiring manual resetting of the high pressure device in order to place the refrigerating apparatus in operation after it has been shut down upon the occurrence of a high pressure condition on the high pressure side of the refrigerating apparatus, is provided.

It may be desirable at times to operate some auxiliary device such as a defrosting fan or circulator in accordance with variations in temperature or pressure on the low pressure side of the refrigerating apparatus and to be able to adjust this controlling action of the auxiliary device simultaneously with the adjustment of the control of the refrigerating apparatus. Such a mechanism is provided in this arrangement and is illustrated in Figures 4 and 5. This mechanism may comprise a support 305 suitably secured to the base 11 by means of screws 306. The support 305 may carry a bracket 307 by means of a screw 309 for securing a conduit 308 carrying suitable wires to be electrically connected to this control device.

The support 305 carries a pin 311 upon which are mounted two operating members 312 and 313, preferably made of insulating material. The operating member 312 is provided with an arm 314 adapted to abut the contact member 191 which engages the cam 251. The operating member 313 is provided with an arm 315 which engages the cam 251. The pin 311 is provided with a collar or nut 316 to which is secured one end of a torsion spring 317, the other end of which is connected to the operating member 312. The torsion spring 317 operates to maintain the arm 314 of the operating member 312 in engagement with the contact member 191. In a like manner, a spring 318 interposed between the bracket 305 and the operating member 313 maintains the arm 315 in engagement with the cam 251.

The operating member 313 is provided with a contact arm 320 carrying contacts 321 and 322. The operating member 312 is provided with a contact arm 323 carrying a contact 324 which is adapted to engage contact 322. The operating member 312 also carries a contact arm 325 provided with a contact 326 for engaging the contact 321. Preferably the contact arms 325 and 323 are insulated from each other. Suitable wiring connections extending through the conduit 308 may be provided for the contacts 321, 322, 324 and 326.

With the parts in the position shown in Figures 4 and 5, contact 324 is engaging contact 322 and contact 326 is engaging contact 321. Upon an increase in temperature or pressure on the low pressure side of the refrigerating apparatus to cause contact 178 to engage contact 180 to move contact arm 191 away from cam 251, the arm 314 is operated to tilt the operating member 312 in a counter-clockwise direction as viewed in Figure 5. This counter-clockwise movement moves contact 324 out of engagement with contact 322 and then moves contact 326 out of engagement with contact 321 whereupon the circuits controlled by these contacts is broken to stop operation of the fan means or the circulator means controlled thereby. Upon a decrease in pressure to cause the contact member 191 to again move into engagement with the cam 251, the arm 314 causes rotation of the operating member 312 in a clockwise direction as viewed in Figure 5 to move contact 326 into engagement with contact 321 and then move contact 324 into engagement with contact 322 to complete the circuits controlled by these contacts to start the fan means or circulating means.

By reason of this arrangement, the contacts 321, 326, 322 and 324 are separated when the temperature or low pressure rises sufficiently to cause the contact member 191 to move away from the cam 251, and are re-engaged when the temperature or pressure decreases to allow the contact member 191 to engage the cam 251. It is here pointed out that adjustment of the cam 251 to adjust the position of the relatively stationary contact 180 with respect to the movable contact 178 simultaneously adjusts the auxiliary control arrangement above described. Accordingly, a single adjustment for the main control of the refrigerating apparatus and for the auxiliary control of the auxiliary apparatus is provided for simultaneously adjusting both in like amounts. Obviously, the operating members 312 and 313 may be operated by the cam 250 and contact member 181 if so desired.

Although for purposes of illustration one form of this invention has been disclosed, other forms thereof may become apparent to those skilled in the art upon reference to this disclosure, and therefore this invention is to be limited only by the scope of the appended claims and prior art.

We claim as our invention:

1. An adjustable control device, comprising in combination, a condition responsive device movable upon changes in a condition, a plurality of contacts operated thereby and movable upon movement of the condition responsive device, a plurality of relatively stationary contacts each adapted to be engaged by a movable contact, a plurality of levers each carrying a stationary contact, a cam for each lever for moving the same to adjust the positions of the relatively stationary contacts with respect to the movable contacts, means associated with each cam for independently operating each cam to adjust independently the switching functions performed by the relatively stationary and movable contacts, and an adjustable calibrating spring opposing movement of said condition responsive device.

2. An adjustable control device, comprising in combination, a condition responsive device movable upon changes in a condition, a pair of movable contacts operated thereby and movable upon movement of the condition responsive device, a pair of relatively stationary contacts adapted to be sequentially engaged by said movable contacts, a pair of arms each carrying one of said relatively stationary contacts, means for biasing the arms in a direction to move the relatively stationary contacts toward the movable contacts, and stop means for the arms for limiting movement of the arms by the biasing means, said biasing means acting as a strain release to permit movement of one of the contacts by the condition responsive device beyond the point where the other movable contact engages its relatively stationary contacts whereby said one contact may engage the other stationary contact.

3. An adjustable control device, comprising in combination, a condition responsive device movable upon changes in a condition, a pair of movable contacts operated thereby and movable upon movement of the condition responsive device, a pair of relatively stationary contacts adapted to be sequentially engaged by said movable contacts, a pair of arms each carrying one of said relatively stationary contacts, means for biasing the arms in a direction to move the relatively stationary contacts toward the movable contacts, stop means for the arms for limiting movement of the arms by the biasing means, said biasing means acting as a strain release to permit movement of one of the contacts by the condition responsive device beyond the point where the other movable contact engages its relatively stationary contact, whereby said one contact may engage the other stationary contact, and means for adjusting the stop means to vary the points at which the contacts engage.

4. An adjustable control device, comprising in combination, a condition responsive device movable upon changes in a condition, a pair of movable contacts operated thereby and movable upon movement of the condition responsive device, a pair of relatively stationary contacts and adapted to be engaged by a movable contact, a pair of arms each carrying a relatively stationary contact, means for biasing the arms in a direction to move the relatively stationary contacts toward the movable contacts, stop means for the arms for limiting movement of the arms by the biasing means, said biasing means acting as a strain release to permit movement of the contacts upon movement of the condition responsive device beyond the points where the movable contacts engage the relatively stationary contacts, said stop means comprising a pair of cams each engaging an arm, and means for independently adjusting the cams to adjust independently the switching functions performed by the relatively stationary and movable contacts.

5. An adjustable control device, comprising in combination, a condition responsive device movable upon changes in a condition, a pair of movable contacts operated thereby and movable upon movement of the condition responsive device, a pair of relatively stationary contacts each adapted to be engaged by a movable contact, a pair of arms each carrying a relatively stationary contact, means for biasing the arms in a direction to move the relatively stationary contacts toward the movable contacts, and stop means for the arms for limiting movement of the arms by the biasing means, said biasing means acting as a strain release to permit movement of the contacts upon movement of the condition responsive device beyond the points where the movable contacts engage the relatively stationary contacts, said stop means comprising a pair of concentrically arranged cams each engaging an arm, and means including concentrically arranged shafts secured to the cams for independently adjusting the cams to adjust independently the switching functions performed by the relatively stationary and movable contacts.

6. An adjustable control device, comprising in combination, a condition responsive device movable upon changes in a condition, an arm operated thereby, a pair of stationary contacts, a pair of movable contacts, means for biasing the movable contacts into engagement with the stationary contacts, an abutment member pivoted to said arm and adapted to abut said movable contacts to disengage them from the stationary contacts against the action of the biasing means, and means for adjustably positioning said abutment member about its pivot to vary relatively the points at which the movable contacts disengage their stationary contacts.

7. In combination, a movable member, means for biasing the movable member to a first position, an arm operable when in a first position for holding the movable member against the action of the biasing means in a second position, means for moving the arm away from the first position to allow the biasing means to move the movable member to the first position, and a switch movable from a first position to a second position when the movable member is moved from the second position to the first position.

8. In combination, a movable member, means for biasing the movable member to a first position, an arm operable when in a first position for holding the movable member against the action of the biasing means in a second position, means for moving the arm away from the first position to allow the biasing means to move the movable member to the first position, means operated by said movable member during movement from the second position to the first position for moving the arm to a second position, and a control device movable from a first position to a second position by said arm upon movement thereof to the second position.

9. In combination, a slidable pin, means for biasing the pin to a first position, a latch surface on said pin, an arm operable when in a first position to engage the latch surface to hold the pin in a second position against the action of the biasing means, means for moving the arm away from the first position and out of engagement with the latch surface to allow the biasing means to move the pin to the first position, a cam surface on the pin for engaging the arm to move the arm to a second position when the pin is moved to the first position, and control means operated by the arm upon movement of the arm to the second position.

10. In combination, a condition responsive device movable upon changes in a condition, a contact operated thereby and movable upon movement of the condition responsive device, an arm, a relatively stationary contact carried by the arm and adapted to be engaged by the movable contact, means for biasing the arm in a direction to move the relatively stationary contact toward the movable contact, an adjustable stop for limiting the movement of the arm by the biasing means for adjusting the stationary contact with respect to the movable contact, a pivot, first and second operating members carried by the pivot, an abutment carried by the first operating member for engaging the arm, an abutment carried by the second operating member for engaging the adjustable stop, and contacts operated by the first and second operating members to a closed position when the arm engages the adjustable stop and to an open position when the arm is moved out of engagement with the adjustable stop.

11. An adjustable control device comprising in combination, a condition responsive device movable upon changes in a condition, a lever operated thereby, a stationary contact, a movable contact, means for biasing the movable contact in engagement with the stationary contact, an abutment member carried by said lever, a movable member, means for biasing the movable member to a first position, an arm operable when in a first position for holding the movable member against the action of the biasing means in a second position, said abutment member moving the arm away from the first position to allow the biasing means to move the movable member to the first position, means operated by said movable member during movement from the second position to the first position for moving the arm to a second position, and means operated upon movement of the arm to a second position for moving the movable contact out of engagement with the stationary contact.

12. An adjustable control device, comprising in combination, a condition responsive device movable upon changes in a condition, an arm operated thereby, a pair of stationary contacts, a pair of movable contacts, means for biasing the movable contacts into engagement with the stationary contacts, means moved by said arm for actuating said movable contacts, and means for adjusting said actuating means with respect to said arm so as to relatively vary the condition values at which each movable contact is actuated.

13. A control device comprising in combination, a stationary contact, a movable contact biased into engagement with said stationary contact, a latch having a first position in which it prevents and a second position in which it permits engagement of said contacts, biasing means for said latch, means for holding said latch in its second position against the action of its biasing means, and condition responsive means for actuating said holding means to release said latch.

ALBERT L. JUDSON.
CARL G. KRONMILLER.